United States Patent
Kakishima et al.

(10) Patent No.: US 10,305,559 B2
(45) Date of Patent: May 28, 2019

(54) USER TERMINAL, RADIO COMMUNICATION SYSTEM AND RADIO COMMUNICATION METHOD

(71) Applicant: NTT DOCOMO, INC., Tokyo (JP)

(72) Inventors: Yuichi Kakishima, Tokyo (JP); Kazuki Takeda, Tokyo (JP); Satoshi Nagata, Tokyo (JP); Tooru Uchino, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 6 days.

(21) Appl. No.: 15/502,574

(22) PCT Filed: Aug. 6, 2015

(86) PCT No.: PCT/JP2015/072409
§ 371 (c)(1),
(2) Date: Feb. 8, 2017

(87) PCT Pub. No.: WO2016/021697
PCT Pub. Date: Feb. 11, 2016

(65) Prior Publication Data
US 2018/0167118 A1  Jun. 14, 2018

(30) Foreign Application Priority Data
Aug. 8, 2014 (JP) .................................. 2014-163017

(51) Int. Cl.
*H04B 7/06* (2006.01)
*H04W 16/32* (2009.01)
(Continued)

(52) U.S. Cl.
CPC .......... *H04B 7/0602* (2013.01); *H04W 16/32* (2013.01); *H04W 72/04* (2013.01); *H04W 88/02* (2013.01); *H04W 76/15* (2018.02)

(58) Field of Classification Search
CPC . H04W 76/15; H04W 48/20; H04W 72/0413; H04B 7/04; H04B 7/0608; H04B 7/061
See application file for complete search history.

(56) References Cited

U.S. PATENT DOCUMENTS

| 2015/0201383 A1* | 7/2015 | Papasakellariou .. H04W 52/367 370/278 |
| 2016/0242182 A1* | 8/2016 | Chen ........................ H04B 7/04 |

OTHER PUBLICATIONS

International Search Report issued PCT/JP2015/072409, dated Oct. 20, 2015 (2 pages).
(Continued)

*Primary Examiner* — Ayaz R Sheikh
*Assistant Examiner* — Debebe A Asefa
(74) *Attorney, Agent, or Firm* — Osha Liang LLP

(57) ABSTRACT

The present invention is designed to control the antenna selection in a user terminal adequately even when the user terminal connects with a plurality of radio base stations by employing dual connectivity (DC). A user terminal supports communication which uses dual connectivity with a plurality of radio base stations that each configure a cell group formed with one or more cells, and this user terminal has a transmission section that transmits UL signals to one or a plurality of cell groups, and a control section that controls the antenna selection for transmitting the UL signals, and, when antenna selection for a serving cell (UE transmit antenna selection) is configured, the control section controls the antenna selection expecting that the plurality of cell groups are not configured.

15 Claims, 10 Drawing Sheets

(51) Int. Cl.
*H04W 72/04* (2009.01)
*H04W 76/15* (2018.01)
*H04W 88/02* (2009.01)

(56) References Cited

OTHER PUBLICATIONS

Written Opinion of the International Searching Authority issued in PCT/JP2015/072409, dated Oct. 20, 2015 (3 pages).
3GPP TS 36.300 V8.5.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; May 2008 (134 pages).
Office Action dated May 31, 2016, in corresponding Japanese Patent Application No. 2014-163017 (6 pages).

* cited by examiner

USER TERMINAL, RADIO COMMUNICATION SYSTEM AND RADIO COMMUNICATION METHOD

TECHNICAL FIELD

The present invention relates to a user terminal, a radio communication system and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower delays and so on (see non-patent literature 1).

In LTE, as multiple-access schemes, a scheme that is based on OFDMA (Orthogonal Frequency Division Multiple Access) is used in downlink channels (downlink), and a scheme that is based on SC-FDMA (Single Carrier Frequency Division Multiple Access) is used in uplink channels (uplink).

A successor system of LTE—referred to as "LTE-advanced" (and also referred to as "LTE-A")—has been under study for the purpose of achieving further broadbandization and increased speed beyond LTE, and the specifications thereof have been drafted as LTE Rel. 10/11. Also, the system band of LTE Rel. 10/11 includes at least one component carrier (CC), where the LTE system band constitutes one unit. Such bundling of a plurality of CCs into a wide band is referred to as "carrier aggregation" (CA).

In LTE Rel. 12, which is a more advanced successor system of LTE, various scenarios to use a plurality of cells in different frequency bands (carriers) are under study. When a plurality of cells are formed by substantially the same radio base station, the above-described CA is applicable. On the other hand, a study is also in progress to employ dual connectivity (DC) when cells are formed by completely different radio base stations.

CITATION LIST

Non-Patent Literature

Non-Patent Literature 1: 3GPP TS 36. 300 "Evolved Universal Terrestrial Radio Access (E-UTRA) and Evolved Universal Terrestrial Radio Access Network (E-UTRAN); Overall Description; Stage 2"

SUMMARY OF INVENTION

Technical Problem

For the uplink (UL) in LTE systems, a transmit diversity (antenna selection diversity) method to make use of antenna switching is stipulated. Transmit diversity to use antenna switching is directed to improving the quality of transmission by switching the antenna (also referred to as "antenna port") which a user terminal uses for UL transmission. UL transmission includes UL data signals (PUSCH signal), UL reference signals (SRS: Sounding Reference Signal) and so on.

LTE systems support a transmit diversity method to make use of antenna switching for each of open-loop and closed-loop. In open-loop antenna selection, a user terminal and/or a radio base station selects the transmitting antenna to use for UL transmission as appropriate, so that antenna selection diversity gain can be achieved.

On the other hand, in closed-loop antenna switching, a radio base station selects antenna ports based on UL channel quality and so on, and reports these to a user terminal as UL transmission antenna ports, and the user terminal makes a selection from the reported antenna ports and carries out UL transmission. By this means, higher diversity gain can be achieved than in open-loop antenna switching. For example, the radio base station can learn UL channel states based on the channel measurement reference signal (for example, the SRS) transmitted from the user terminal, and specify the antennas that the user terminal should use. If antenna selection (UE transmit antenna selection) is configured in the user terminal, the user terminal can select a predetermined antenna port based on commands from the radio base station.

In carrier aggregation (CA) stipulated in LTE-A systems, when antenna selection (UE transmit antenna selection) is employed, a common transmitting antenna is used between different cells (also referred to as "CCs"). By this means, even when a user terminal connects with a plurality of cells, the user terminal can communicate using a single RF circuit and/or the like, so that it is possible to reduce the increase of the user terminal's circuit scale including baseband (BB) and RF circuits.

However, as in dual connectivity (DC), when the user terminal connects with a plurality of radio base stations, it might occur that these multiple radio base stations all carry out scheduling independently, and, furthermore, these multiple radio base stations may not be necessarily synchronized and may operate asynchronously. Consequently, when the user terminal employs antenna selection in DC, the user terminal has difficulty selecting the same transmitting antenna in all CCs, as in CA.

The present invention has been made in view of the above, and it is therefore an object of the present invention to provide a user terminal, a radio communication system and a radio communication method, whereby, even when a user terminal connects with a plurality of radio base stations by employing dual connectivity (DC), it is possible to control the antenna selection in the user terminal adequately.

Solution to Problem

According to one aspect of the present invention, a user terminal supports communication which uses dual connectivity with a plurality of radio base stations that each configure a cell group formed with one or more cells, and this user terminal has a transmission section that transmits UL signals to one or a plurality of cell groups, and a control section that controls antenna selection for transmitting the UL signals, and, when antenna selection for a serving cell (UE transmit antenna selection) is configured, the control section controls the antenna selection expecting that the plurality of cell groups are not configured.

Advantageous Effects of Invention

According to the present invention, even when a user terminal connects with a plurality of radio base stations by employing dual connectivity (DC), it is possible to control the antenna selection in the user terminal adequately.

DESCRIPTION OF EMBODIMENTS

FIG. 1 provide diagrams to show examples of cell structures in carrier aggregation (CA) and dual connectivity (DC). In FIG. 1, the UE is connected with five cells (C1 to C5). Cases are assumed here where C1 is a PCell (Primary Cell), and C2 to C5 are SCells (Secondary Cells).

Figure 1A:
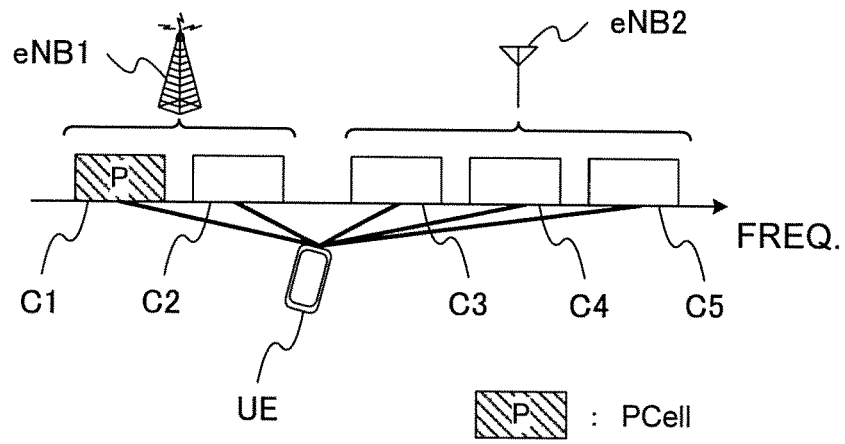
FIG. 1 provide diagrams to show communication between radio base stations and a user terminal in carrier aggregation and dual connectivity.

FIG. 1A shows communication between radio base stations and a user terminal in carrier aggregation (CA). CA is a technique to bundle a plurality of frequency blocks (also referred to as "component carriers" (CCs), "cells," etc.) into a wide band. Each CC has, for example, a maximum 20 MHz bandwidth, so that, when maximum five CCs are bundled, a wide band of maximum 100 MHz is provided.

In the example shown in FIG. 1A, radio base station eNB1 is a radio base station to form a macro cell (hereinafter referred to as the "macro base station"), and radio base station eNB2 is a radio base station to form a small cell (hereinafter referred to as the "small base station"). For example, the small base station may be structured like an RRH (Remote Radio Head) that connects with the macro base station. Based on this, CA may be referred to as "intra-base station CA" (intra-eNB CA).

When carrier aggregation is employed, one scheduler (for example, the scheduler provided in macro base station eNB1) controls the scheduling of multiple cells. In the structure in which the scheduler provided in macro base station eNB1 controls the scheduling of multiple cells, each radio base station may be connected by using, for example, an ideal backhaul that provides a high speed channel, such as optical fiber. Also, CA provides support for timing advance groups (TAGs), which are classified based on transmission timings, and the maximum transmission timing gap between varying TAGs is 32.47 μs.

Figure 1B:
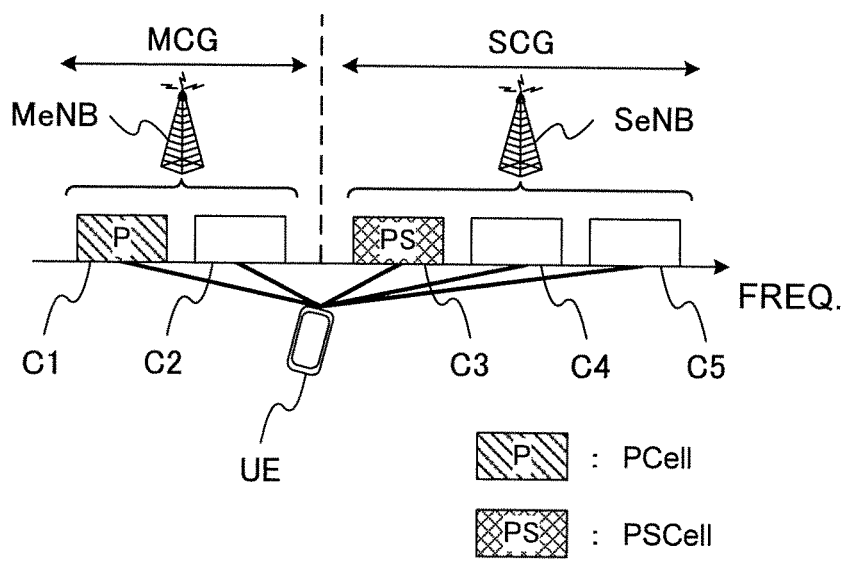

FIG. 1B shows communication between radio base stations and a user terminal in dual connectivity (DC). When dual connectivity is employed, a plurality of schedulers are provided separately, and these multiple schedulers (for example, the scheduler provided in the radio base station MeNB and the scheduler provided in the radio base station SeNB) each control the scheduling of one or more cells thy have control over. Based on this, DC may be referred to as "inter-base station CA" (inter-eNB CA). Note that, in DC, carrier aggregation (intra-eNB CA) may be employed per individual scheduler (that is, base station) that is provided.

In the structure in which the scheduler provided in the radio base station MeNB and the scheduler provided in the radio base station SeNB control the scheduling of one or more cells they each have control over, each radio base station may be connected by using, for example, a non-ideal backhaul that produces substantial delays, such as the X2 interface. Also, in DC, the radio base stations are also capable of operating completely asynchronously, so that cases might occur where maximum 500 μs of transmission timing gaps are produced in communication between different radio base stations.

As shown in FIG. 1B, in dual connectivity, each radio base station configures a cell group (CG) that is comprised of one or a plurality of cells. Each cell group is comprised of one or more cells formed by the same radio base station, or one or more cells formed by the same transmission point, which may be a transmitting antenna apparatus, a transmission station and so on.

The cell group that includes the PCell will be hereinafter referred to as the "master cell group" (MCG), and the cell group that is not the master cell group will be hereinafter referred to as the "secondary cell group" (SCG). The total number of cells to constitute the MCG and the SCG is configured to be equal to or less than a predetermined value (for example, five cells).

The radio base station in which the MCG is configured (and which communicates by using the MCG) will be hereinafter referred to as the "master base station" (MeNB: Master eNB), and the radio base station in which the SCG is configured (and which communicates by using the SCG) will be hereinafter referred to as the "secondary base station" (SeNB: Secondary eNB).

Dual connectivity does not presume tight cooperation between radio base stations that is equivalent to that used in carrier aggregation. Consequently, the user terminal is able to execute downlink L1/L2 control (PDCCH/EPDCCH) and uplink L1/L2 control (UCI (Uplink Control Information) feedback through the PUCCH/PUSCH) independently, on a per cell group basis. Consequently, the SeNB, too, needs a special SCell that has equivalent functions to those of the PCell (for example, the common search space, the PUCCH and so on). A special SCell having equivalent functions to those of the PCell will be also referred to as a "PSCell."

Now, in the uplink (UL) of LTE/LTE-A systems, transmit diversity methods to make use of antenna selection are used. Also, in the antenna selection in carrier aggregation (CA) shown in FIG. 1A, there is a rule to select a common transmitting antenna between different cells (CCs). That is, a user terminal operates on the assumption that the antenna to be selected when transmitting predetermined UL signals (for example, the PUSCH, the SRS and so on) is the same in all cells.

Figure 2A:
FIG. 2 provide diagrams to show examples of antenna selection diversity in carrier aggregation.

For example, when the user terminal connects with cell #0 and cell #1 by using CA, the same antenna port is used in UL transmission (for example, PUSCH transmission) in cell #0 and cell #1. When the user terminal uses two antenna ports (Tx0 and Tx1) in UL transmission, the user terminal selects either Tx0 or Tx1 and communicates with a plurality of CCs (see FIG. 2A).

Figure 2B:
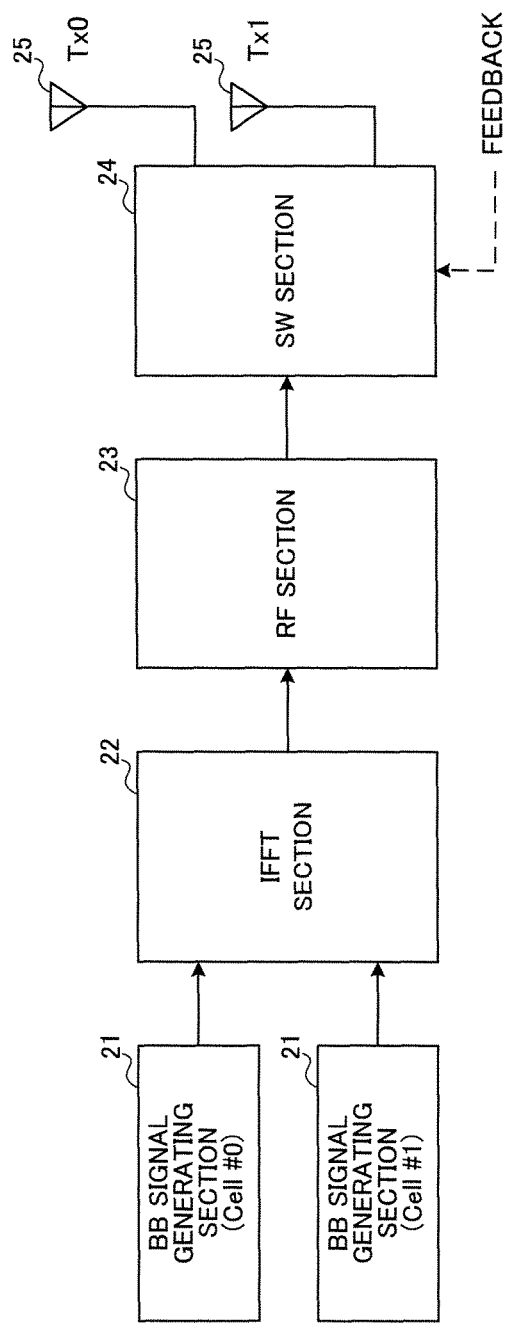

In this way, when the user terminal connects with a plurality of cells (CC), the user terminal can communicate with a single RF switch, RF circuit (amplifier and/or the like) and so on by using a common antenna in different CCs. By this means, it becomes possible to reduce the increase of the user terminal's circuit scale (see FIG. 2B). Note that FIG. 2B shows an example of the structure of a user terminal that employs CA.

A BB signal generating section (baseband signal generator) 21 generates a UL signal (uplink control signal, uplink data signal, uplink reference signal and so on). A data signal is subjected to a coding process and a modulation process based on a coding rate and a modulation scheme that are determined based on channel states and so on. The signal that is generated is subjected to subcarrier mapping, precoding and so on, and output to an IFFT section 22.

In the IFFT section 22, the frequency domain signal that is input from the BB signal generating section 21 is subjected to an inverse fast Fourier transform (IFFT), converted into a time domain signal, and output to an RF section 23.

In the RF section 23, the baseband signal that is input from the IFFT section 22 is converted into a radio frequency band and output to a SW section 24. For example, the RF section 23 can generate the frequencies of cell #0 and cell #1 based on predetermined reference signals, and convert the baseband signal.

The SW section 24 switches the antenna 25 (antenna port) for transmitting the signal input from the RF section 23, in accordance with feedback information from the radio base stations. This feedback information may be, for example, antenna selection information for specifying the antenna to switch to.

Note that, although antenna selection diversity upon signal transmission has been shown with the above-described example, this is by no means limiting.

Meanwhile, when dual connectivity (DC), which is introduced in Rel. 12 and later versions, is employed, the problem lies in how to control transmit diversity methods that use antenna switching. For example, when DC is employed, antenna selection may be controlled in the same way as in CA (a common antenna may be selected in all CCs).

However, in dual connectivity (DC), a plurality of radio base stations each control the scheduling separately. Furthermore, a plurality of radio base stations may not be necessarily synchronized, and cases might occur where they operate asynchronously. When a plurality of radio base stations operate asynchronously, the transmission timings of UL signals from a user terminal to varying radio base stations may differ significantly.

Consequently, it becomes difficult to control a user terminal that employs closed-loop antenna selection to select the same transmitting antenna in different CCs (in particular, in CCs of different cell groups). Also, when the user terminal selects the same transmitting antenna between different CCs, transmit diversity to use antenna switching might fail to provide a sufficient effect depending on the method of selection, which has a threat of lowering the quality of communication.

So, assuming the case where connections are established with a plurality of radio base stations by employing dual connectivity (DC), the present inventors have come up with the idea of controlling the transmitting antenna selection in a user terminal by taking into consideration the operation of communication in DC.

Now, the present embodiment will be described below in detail. Note that, although the following description will assume cases where, in the event dual connectivity (DC) is employed, antenna selection (UE transmit antenna selection) is carried out when predetermined UL transmission (PUSCH transmission and/or SRS transmission) is made, the UL transmission to which the present embodiment can be applied is by no means limited to this, and may include, for example, other uplink channels and signals such as the PUCCH, the PRACH, the DM-RS and so on. Also, although cases will be shown in the following description where a user terminal controls the selection of two antennas (antenna ports), the number of antenna ports is by no means limited to this. Furthermore, the present embodiment is applicable to both open-loop antenna selection and closed-loop antenna selection.

First Example

A case will be described with a first example where antenna selection diversity is applied by controlling antenna selection on a per radio base station (or cell group) basis. That is, the first example focuses on the fact that, when dual connectivity (DC) is employed, scheduling control and so on are carried out in cell group units, and, accordingly, controls antenna selection in cell group units.

A case will be assumed here where, as shown in FIG. 3, a user terminal connects with five cells (cell #0 to cell #4). FIG. 3 show a case where radio base station #1 (eNB #1) configures cell #0 and cell #1, and radio base station #2 (eNB #2) configures cell #2 to cell #4.

Also, a case is illustrated here in which radio base station #1 is the master base station (MeNB: Master eNB), and the master cell group (MCG) is formed with cell #0 and cell #1 (where cell #0 or cell #1 is the PCell). Also, a case is illustrated here in which radio base station #2 is a secondary base station (SeNB: Secondary eNB), and a secondary cell group (SCG) is formed with cell #2 to cell #4 (a case where one of cell #2 to cell #4 is a PSCell). Obviously, the structure to which the present embodiment can be applied is by no means limited to this.

Figure 3A:
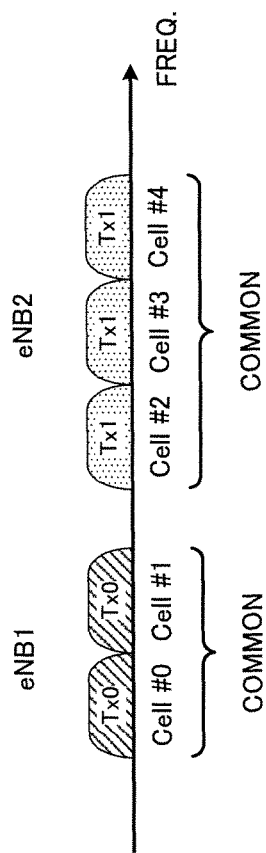
FIG. 3 provide diagrams to show examples of antenna selection diversity in dual connectivity.
Figure 3B:
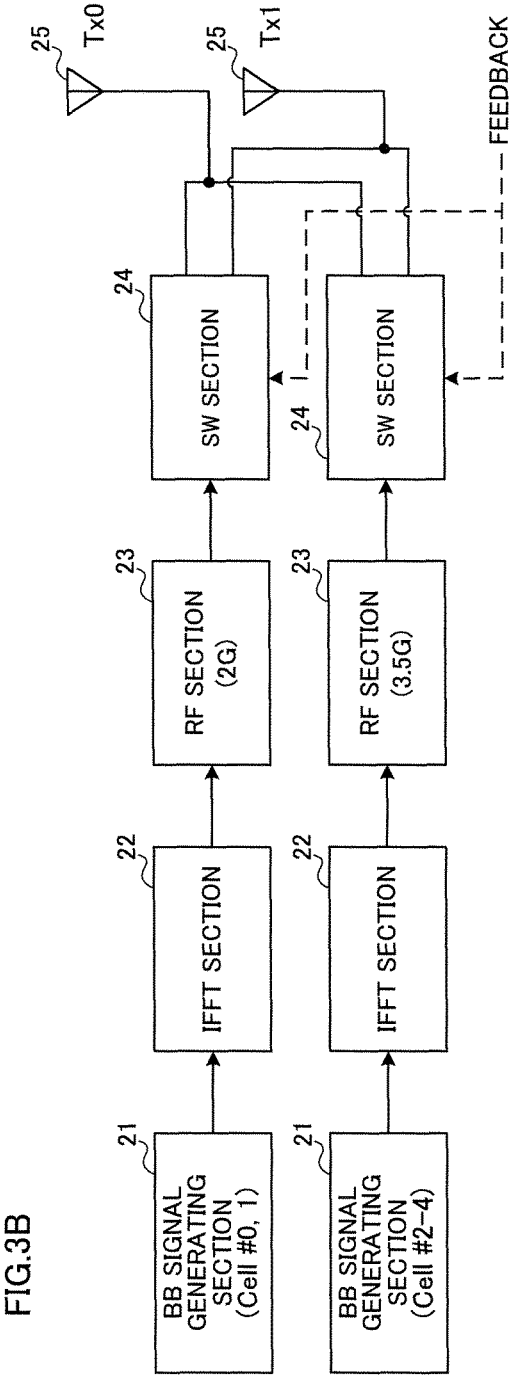

With the first example, as shown in FIG. 3A, a user terminal selects antennas per radio base station (or cell group). That is, antenna selection is controlled on a per cell group basis.

For example, it is possible to select a common antenna port (in FIG. 3A, Tx0) for the cells that constitute the master cell group (cell #0 and cell #1) and carry out UL transmission. It is also possible to select a common antenna port (in FIG. 3A, Tx1) for the cells that constitute the secondary cell group (cell #2 to cell #4) and carry out UL transmission. Note that the user terminal has only to select a common antenna at least for every cell group, and can use the same antenna or use different antennas between cell groups. Furthermore, this operation is applicable either when cell groups are synchronized or not synchronized.

In this way, by controlling the selection of antennas in a user terminal on a per cell group basis and applying antenna selection diversity, it becomes possible to achieve adequate diversity gain in each cell group and improve the quality of communication. Also, by selecting a common antenna in the same cell group, it is possible to reduce the complexity of the user terminal's circuit structure. In particular, even when inter-frequency CA (inter-band CA) is executed per radio base station, it is possible to reduce the expansion of RF circuits (see FIG. 3B).

Referring to FIG. 3A, when open-loop transmitting antenna selection (open-loop UE transmit antenna selection) is employed, for example, a user terminal can select a predetermined antenna port per radio base station (cell group).

When closed-loop transmitting antenna selection (closed-loop UE transmit antenna selection) is employed, each radio base station selects a predetermined antenna port and reports antenna selection information about the antenna port to the user terminal. Based on the antenna selection information that is reported, the user terminal can select the antenna port to apply to each cell group's UL transmission.

For example, in closed-loop transmitting antenna selection, the user terminal can select a predetermined antenna (antenna port) based on information included in downlink control information (DCI), which is transmitted via a downlink control channel (PDCCH and/or EPDCCH). For the downlink control information, UL grants (for example, DCI format 0 and/or DCI format 4) can be used. Obviously, the method of reporting antenna selection information is by no means limited to this.

Also, when, as shown in FIG. 3A, a plurality of cell groups are configured in a user terminal, this user terminal can operate on the assumption that the same antenna port value (transmit antenna port value) is reported in each cell group. For example, referring to FIG. 3A, the user terminal can assume, in a predetermined subframe, that antenna selection information to specify the same antenna port value (for example, Tx0) is included in downlink control signals that are transmitted respectively from cell #0 and cell #1 constituting the master cell group.

Also, when a plurality of cell groups are configured in the user terminal, the user terminal can operate on the assumption that, in each cell group, simultaneous transmissions of UL signals (for example, SRSs) to use different antenna ports do not take place. For example, in FIG. 3A, the user terminal can assume that simultaneous SRS transmissions to use different antenna ports (to use, for example, Tx0 in cell #0 and Tx1 in cell #1) are not made from cell #0 and cell #1 that constitute the master cell group.

In this case, in closed-loop control, it is possible to send a report of the selected antenna only from one cell belonging to the cell group and simplify the signaling, or report the same antenna in all cells and make uniform (simplify) the specifications of signaling, or simplify the signaling control by determining the cell where signaling is prioritized.

In this way, the user terminal selects the same antenna port for cells (CCs) that constitute the same cell group, so that it is possible to simplify the circuit structure, and, furthermore, achieve improved diversity gain.

Also, the present embodiment may be provided in a structure in which the configuration of transmitting antenna selection (UE transmit antenna selection) is controlled (enabled/disabled) on a per radio base station (cell group) basis. For example, it is possible to configure (enable) antenna selection in the master cell group (cell #0, cell #1), and not configure (disable) antenna selection in the secondary cell group (cells #2 to #4). In this case, whether or not to apply antenna selection diversity to the user terminal may be controlled by each radio base station or may be controlled by the PCell.

Note that, although a case is illustrated in FIG. 3A where antenna selection is controlled per radio base station (cell group), the present embodiment is by no means limited to this. Besides this, antenna selection may be employed on a per timing advance group (TAG) basis, or antenna selection may be employed on a per frequency (band) basis. Also, it is equally possible to employ antenna selection by combining cell groups, timing advance groups and frequencies (bands).

Second Example

A case will be described with a second example where, when dual connectivity (DC) is employed, different transmitting antennas can be selected in every cell (CC).

Figure 4:
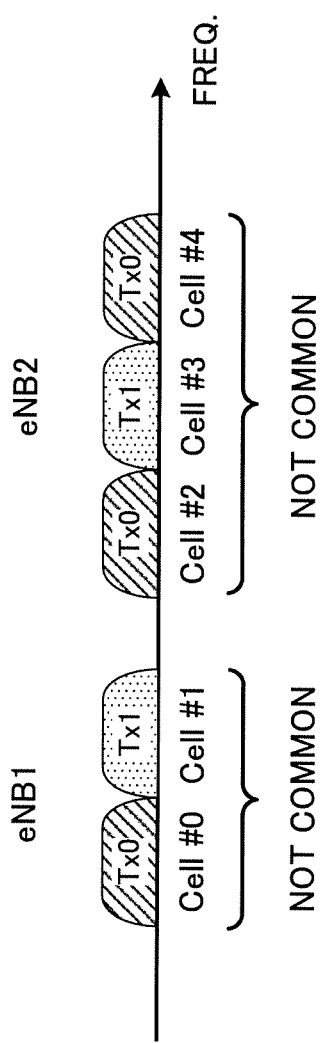
FIG. 4 is a diagram to show another example of antenna selection diversity in dual connectivity.

For example, as shown in FIG. 4, a case will be assumed here where a user terminal connects with a master cell group (radio base station #1), which includes cell #0 and cell #1, and a secondary cell group (radio base station #2), which includes cell #2 to cell #4.

With the second example, different transmitting antennas are selected on a per cell (CC) basis (see FIG. 4). That is, for antenna selection for UL transmission, the antenna port to use is selected in cell (CC) units. In FIG. 4, a case is shown where antenna port 0 (Tx0) is selected for UL transmission for cell #0, cell #2 and cell #4, and antenna port 1 (Tx1) is selected for UL transmission for cell #1 and cell #3.

For example, when closed-loop transmitting antenna selection (closed-loop UE transmit antenna selection) is employed, each radio base station selects a predetermined antenna port per cell (CC), and reports antenna selection information to the user terminal. For example, antenna selection information that is selected per cell is included in downlink control information to be transmitted from each cell, and reported to the user terminal. The user terminal can select the antenna port to use for each cell's UL transmission based on the antenna selection information that is reported. Note that the transmitting antennas may be selected in the state a plurality of cells are synchronized or in the state they are not synchronized.

In this way, by controlling antenna selection on a per cell (CC) basis and applying antenna selection diversity across cell groups, it becomes possible to improve the transmit diversity effectively. In particular, when every cell uses a different frequency, it becomes possible to control antenna selection diversity flexibly by controlling antenna selection on a per cell basis.

Third Example

A case will be described with a third example where, when dual connectivity (DC) is employed, the application of antenna selection diversity is limited.

According to the third example, when dual connectivity (DC) is employed, a user terminal and/or a radio base station operate not to apply antenna selection to UL transmission. In this case, the user terminal can carry out UL transmission by using a predetermined antenna port. For example, when DC is configured, the user terminal can select a predetermined antenna port (for example, Tx0) and carry out UL transmission. By this means, it becomes possible to simplify the user terminal's operation when dual connectivity (DC) is employed.

To be more specific, for example, when DC is configured and TM1 is configured, the user terminal may transmit the PUSCH and the SRS by using antenna port 0.

Also, if antenna selection for the serving cell is configured, the user terminal can operate on the assumption that a plurality of cell groups are not configured. That is, the application of antenna selection can be limited in the step DC is configured. Also, when multiple (for example, two or more) cell groups are configured, the user terminal can operate on the assumption that UL signals (for example, SRSs) are not transmitted simultaneously from different antenna ports.

Alternatively, a structure may be employed here in which, when dual connectivity (DC) is employed, the user terminal applies antenna selection to the cells (CCs) that constitute one cell group (for example, the MCG), and does not apply antenna selection to the cells that constitute another cell group (for example, the SCG). In this case, control may be applied so that the same antenna port is selected for the CCs that constitute a cell group where antenna selection is employed, as has been shown with the first example.

Fourth Example

A case will be described with a fourth example where, when dual connectivity (DC) is employed, antennas are selected according to predetermined rules.

When dual connectivity (DC) is employed, it is possible to control a user terminal to use the antenna port that is selected in a specific cell group in another cell group as well. For example, the antenna port that is selected in a specific cell group (for example, the MCG) among a plurality of connecting cells groups, with which the user terminal is connected, is selected in another cell group (for example, an SCG) (see FIG. 5).

Figure 5:
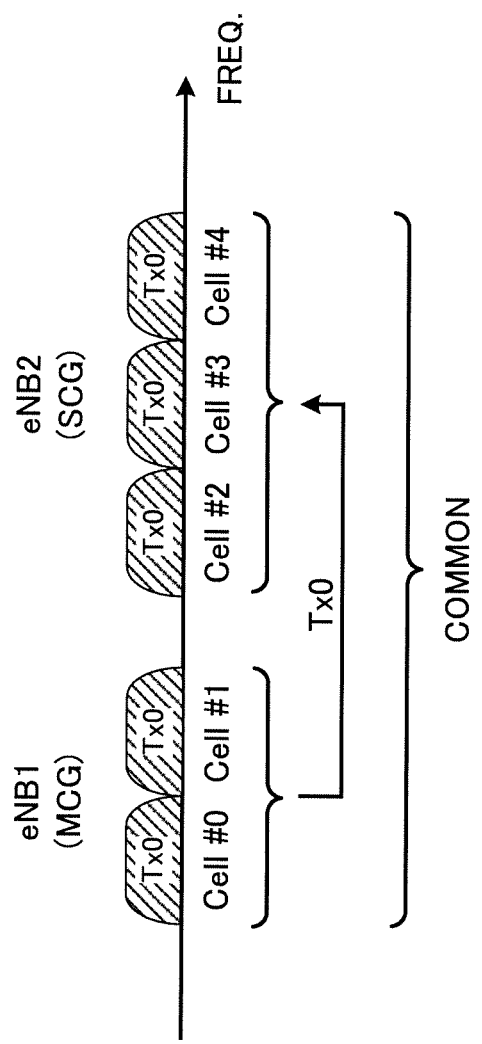
FIG. 5 is a diagram to show another example of antenna selection diversity in dual connectivity.

In the case illustrated in FIG. 5, the user terminal applies Tx0, which is selected in the master cell group (cell #0 and cell #1), to the UL transmission of the secondary cell group (cells #2 to #4).

When closed-loop transmitting antenna selection (closed-loop UE transmit antenna selection) is employed, in each cell group, antenna port information is reported from the radio base station to the user terminal. Consequently, in FIG. 5, when antenna port information is reported from the radio base station to the user terminal in the secondary cell group, the user terminal ignores the antenna port information that is reported, and controls the UL transmission of the secondary cell group by using the antenna port that is selected in the master cell group.

In this case, if a plurality of cell groups are configured, the user terminal can operate on the assumption that the antenna port value that is reported in the cells that constitute the macro cell group is included in the downlink control information (for example, DCI format 0) that is transmitted in each cell. Also, the user terminal, in which a plurality of cell groups are configured, can select the antenna port that is used for SRS transmission in the cells that constitute the macro cell group, and control the SRS transmission in other cells.

Note that, in the case illustrated in FIG. 5, a structure may be employed in which antenna selection information related to antenna ports is not reported from another cell group (SCG) to the user terminal. In this case, the user terminal can control antenna selection based on antenna selection information that is transmitted in a predetermined cell group (for example, the MCG).

Similarly, in the case shown in FIG. 5, a structure may be employed in which antenna selection information is reported from a single cell (CC), and antenna selection information related to antenna ports is not reported from other cells to the user terminal. In this case, the user terminal can control antenna selection based on the antenna selection information that is transmitted in a predetermined cell (for example, cell #0).

In this way, by applying the antenna port that is selected in a specific cell group to other cell groups, it is possible to simplify the antenna selection operation in a user terminal, and, furthermore, achieve transmit diversity gain.

Alternatively, when dual connectivity (DC) is employed, the user terminal can select the antenna port that is used to transmit another physical channel. For example, referring to the structure shown in above FIG. 3A, a case will be assumed here in which the PUCCH is transmitted in cell #0 and the PUSCH is transmitted in cell #1.

In this case, for the antenna port for the PUSCH transmission in cell #1, the user terminal can select the antenna port to use for the PUCCH transmission of cell #0 (for example, Tx0). That is, the antenna that is used to transmit the PUSCH, the SRS and so on is associated and controlled with the transmitting antenna for a different physical channel (for example, the PUCCH). Note that this different physical channel may be a physical channel that is transmitted in a cell of the same cell group, or may be a physical channel that is transmitted in another cell group.

In this way, by applying antenna selection diversity based on an antenna port that is used for a specific physical channel (for example, the PUCCH), it is possible to simply the antenna selection operation in a user terminal, and, furthermore, achieve transmit diversity gain.

Alternatively, when dual connectivity (DC) is employed, the user terminal may switch the transmitting antenna based on an equation that is provided in in advance. In particular, since achieving diversity gain with closed-loop control is not the primary purpose of switching the SRS transmitting antenna, it is possible to simplify the control and signaling in base stations by determining the switching method in advance. This equation may be designed based on, for example, cell IDs (for example, the cell IDs of the PCell, PSCell and each cell), subframe numbers and slot numbers.

For the equation shown above, for example, the function of uplink SRS antenna switching, which is set forth in Rel. 8 LTE, may be re-cycled. Also, the switching method based on the equation shown above may be carried out per cell or per cell group, or may be executed for all cells altogether. In addition, the switching method based on the above equation is applicable regardless of the classification of synchronized cells and asynchronous cells.

(Variations)

Note that, when dual connectivity (DC) is employed, a structure may be employed in which antenna selection is controlled as appropriate on the user terminal side. That is, by allowing the user terminal side to have flexibility in antenna selection, it becomes possible to select antenna ports flexibly, on a per user terminal basis, and carry out UL transmission. In particular, when open-loop transmitting antenna selection (open-loop UE transmit antenna selection) is employed, it is preferable to use a structure in which antenna ports are selected as appropriate on the user terminal side.

Regarding the above technique, different methods may be used for different physical channels and signals of the uplink. For example, separate methods may be applied to PUSCH antenna switching, which is based on closed-loop control, and SRS antenna switching, which is based on open-loop control.

Also, although cases have been shown with the above description where, when closed-loop transmitting antenna selection (closed-loop UE transmit antenna selection) is employed, antenna selection information is dynamically reported from the radio base stations to the user terminal by using downlink control information (for example, DCI format 0), the present embodiment is by no means limited to this. Besides this, it is equally possible to report antenna selection information to the user terminal semi-statically by using higher layer signaling (RRC signaling, broadcast information, etc.).

For example, when a handover (intra-MeNB HO) is carried out within the master base station (intra-MeNB), cases might occur where RRC re-configuration has to be made. In this case, the user terminal re-selects the antenna for UL transmission for each radio base station (cell group). Consequently, when a handover is conducted, by reporting the antenna selection information to use in each cell group (radio base station) to the user terminal by using RRC signaling, it is possible to control the selection of antennas adequately.

Also, when dual connectivity (DC) is employed, it is possible to share information about antenna selection between each radio base station (cell group). For example, it is possible to exchange information about the antenna to employ in each cell group (or cell) between the master base station and secondary base stations via a backhaul link (for example, X2 interface). By this means, each radio base station can select the antenna port to report to the user terminal based on information about the antennas used in other radio base stations (cell groups).

Similarly, when dual connectivity (DC) is employed, the switching method may be determined based on information that is shared between radio base stations (cell groups). For example, switching may be carried out based on cell IDs that are shared between the master base station and secondary base stations.

(Structure of Radio Communication System)

Now, the structure of a radio communication system according to an embodiment of the present invention will be described below. In this radio communication system, one of the above-described first to fourth examples and variations, or a combination of these, is employed.

Figure 6:
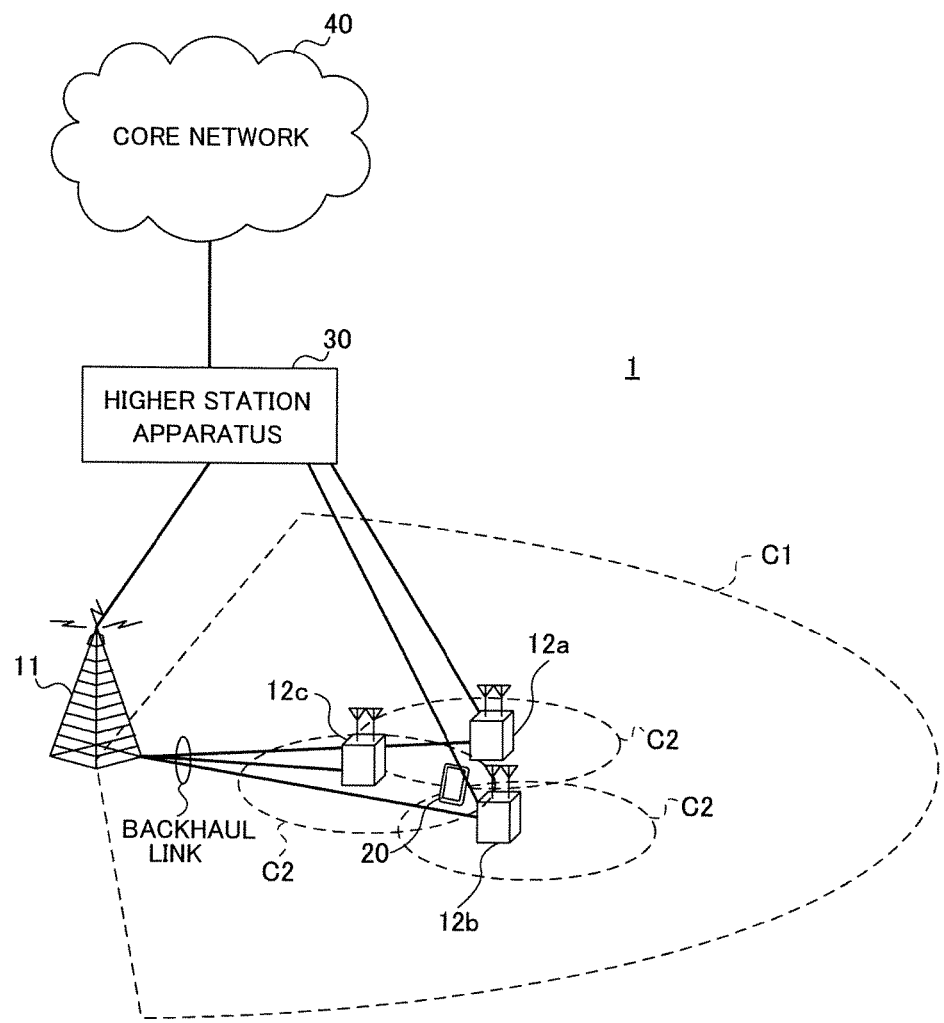
FIG. 6 is a diagram to show an example of a schematic structure of a radio communication system according to the present embodiment.

FIG. 6 is a schematic configuration diagram of a radio communication system according to the present embodiment. Note that the radio communication system shown in FIG. 6 is, for example, an LTE system, or a system to incorporate SUPER 3G. This radio communication system can adopt dual connectivity (DC), which allows a user terminal to connect with a plurality of radio base stations that each have a scheduler. Also, each radio base station can configure a cell group that is formed with at least one cell. Also, this radio communication system may be referred to as "IMT-advanced," or may be referred to as "4G," "FRA" (Future Radio Access), "5G," etc.

As shown in FIG. 6, a radio communication system 1 is comprised of a plurality of radio base stations 10 (11 and 12), and a plurality of user terminals 20 that are present within cells formed by each radio base station 10 and that are configured to be capable of communicating with each radio base station 10. The radio base stations 10 are each connected with a higher station apparatus 30, and are connected to a core network 40 via the higher station apparatus 30.

Referring to FIG. 6, the radio base station 11 is constituted by, for example, a macro base station that has a relatively wide coverage, and forms a macro cell C1. The radio base stations 12 are constituted by small base stations that have local coverages, and form small cells C2. Note that the number of radio base stations 11 and 12 is not limited to that shown in FIG. 6.

The macro cell C1 and the small cells C2 may use the same frequency band or may use different frequency bands. Also, the radio base stations 11 and 12 are connected with each other via an inter-base station interface (for example, optical fiber, the X2 interface, etc.).

Note that the radio base station 11 (macro base station) may be referred to a "radio base station," an "eNodeB" (eNB), a "transmission point," and so on. The radio base stations 12 (small base stations) may be referred to as "pico base stations," "femto base stations," "home eNodeBs" (HeNBs), "transmission points," "RRHs" (Remote Radio Heads), and so on. Hereinafter the radio base stations 11 and 12 will be collectively referred to as "radio base stations 10," unless specified otherwise.

The higher station apparatus 30 may be, for example, an access gateway apparatus, a radio network controller (RNC), a mobility management entity (MME) and so on, but is by no means limited to these.

The user terminals 20 are terminals to support various communication schemes such as LTE, LTE-A and so on, and may include both mobile communication terminals and stationary communication terminals. Also, the user terminals 20 can apply transmit diversity that makes use of antenna switching, to uplink transmission. For example, closed-loop transmitting antenna selection (closed-loop UE transmit antenna selection) and/or open-loop transmitting antenna selection (open-loop UE transmit antenna selection) can be employed when UL transmission (for example, PUSCH and/or SRS transmission) is carried out.

In closed-loop transmitting antenna selection, a user terminal can select a predetermined antenna port (for example, one antenna port) by using antenna selection information (for example, information about a predetermined antenna port) that is specified by a radio base station. On the other hand, in open-loop transmitting antenna selection, a predetermined antenna port (for example, one antenna port) can be selected as appropriate on the user terminal side. For the method of controlling antenna selection in the user terminal, one of the above-described first to fourth examples and variations, or a combination of these, can be used.

In the radio communication system, as radio access schemes, OFDMA (Orthogonal Frequency Division Multiple Access) is applied to the downlink, and SC-FDMA (Single-Carrier Frequency Division Multiple Access) is applied to the uplink. OFDMA is a multi-carrier communication scheme to perform communication by dividing a frequency band into a plurality of narrow frequency bands (subcarriers) and mapping data to each subcarrier. SC-FDMA is a single-carrier communication scheme to mitigate interference between terminals by dividing the system band into bands formed with one or continuous resource blocks per terminal, and allowing a plurality of terminals to use mutually different bands. Note that the uplink and downlink radio access schemes are by no means limited to the combination of these.

In the radio communication system 1, a downlink shared channel (PDSCH: Physical Downlink Shared CHannel), which is used by each user terminal 20 on a shared basis, a broadcast channel (PBCH: Physical Broadcast CHannel), downlink L1/L2 control channels and so on are used as downlink channels. User data, higher layer control information and predetermined SIBs (System Information Blocks) are communicated in the PDSCH. Also, synchronization signals, MIBs (Master Information Blocks) and so on are communicated by the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. HARQ delivery acknowledgement signals (ACKs/NACKs) in response to the PUSCH are communicated by the PHICH. The EPDCCH may be frequency-division-multiplexed with the PDSCH (downlink shared data channel) and used to communicate DCI and so on, like the PDCCH.

In the radio communication system 1, an uplink shared channel (PUSCH (Physical Uplink Shared CHannel)), which is used by each user terminal 20 on a shared basis, an uplink control channel (PUCCH (Physical Uplink Control CHannel)), a random access channel (PRACH (Physical Random Access CHannel)) and so on are used as uplink channels. User data and higher layer control information are communicated by the PUSCH. Also, downlink radio quality information (CQI: Channel Quality Indicator), delivery acknowledgment signals (HARQ-ACKs) and so on are communicated by the PUCCH. By means of the PRACH, random access preambles (RA preambles) for establishing connections with cells are communicated. Also, a channel quality measurement reference signal (SRS: Sounding Reference Signal) and a demodulation reference signal (DM-RS) for demodulating the PUCCH and the PUSCH are communicated as uplink reference signals.

Figure 7:
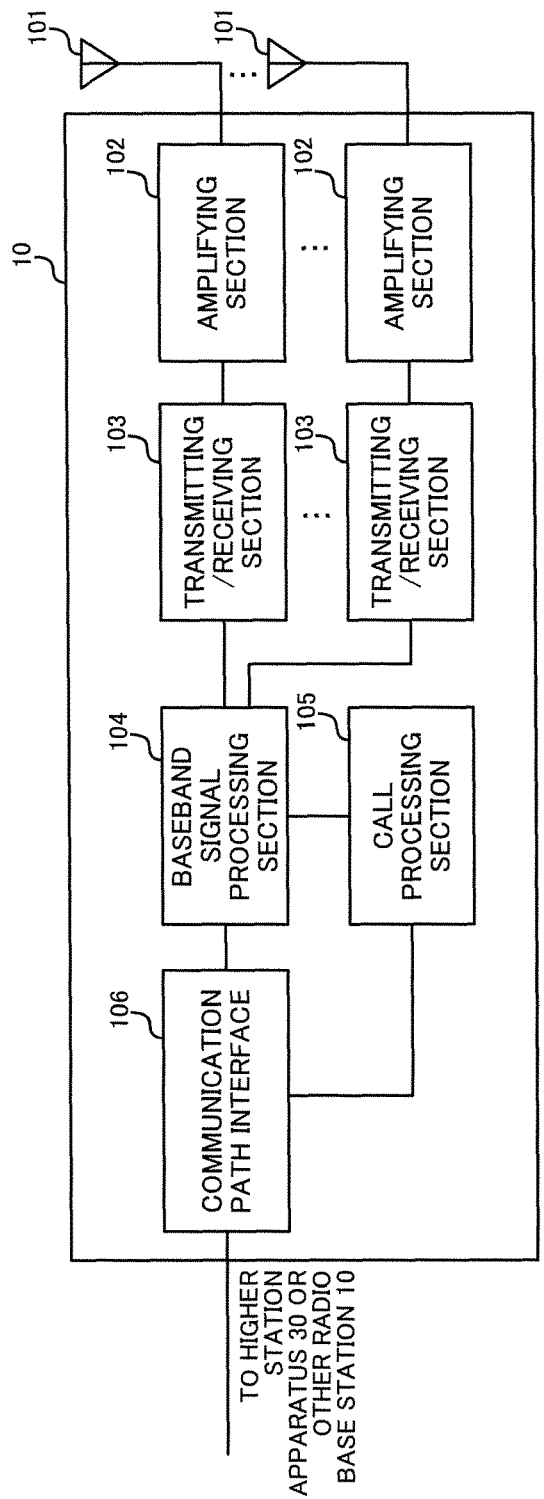
FIG. 7 is a diagram to show an example of an overall structure of a radio base station according to the present embodiment.

FIG. 7 is a diagram to explain an overall structure of a radio base station 10 according to the present embodiment. The radio base station 10 (which may be either a radio base station 11 or 12) has a plurality of transmitting/receiving antennas 101 (antenna ports), amplifying sections 102, transmitting/receiving sections 103, a baseband signal processing section 104, a call processing section 105 and a communication path interface 106. Note that the transmitting/receiving sections 103 are comprised of transmitting sections and receiving sections.

User data (DL data) to be transmitted from the radio base station 10 to a user terminal 20 on the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

In the transmitting/receiving sections 103, the downlink signals that are pre-coded and output from the baseband signal processing section 104 on a per antenna basis are converted into a radio frequency band and transmitted. The radio frequency signals having been subjected to frequency conversion in the transmitting/receiving sections 103 are amplified in the amplifying sections 102, and transmitted from the transmitting/receiving antennas 101. For the transmitting/receiving sections 103, transmitters/receivers, transmitting/receiving circuits or transmitting/receiving devices that can be described based on common understanding of the technical field to which the present invention pertains can be used.

Meanwhile, as for uplink signals, radio frequency signals that are received the transmitting/receiving antennas 101 are amplified in each amplifying section 102. Each transmitting/receiving section 103 receives the uplink signals amplified in the amplifying sections 102. The received signals are converted into the baseband signal through frequency conversion in the transmitting/receiving sections 103, and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base station 10 and manages the radio resources.

The communication path interface section 106 transmits and receives signals to and from the higher station apparatus 30 via a predetermined interface. Also, the communication path interface 106 transmits and receives signals to and from neighboring radio base stations 10 (backhaul signaling) via an inter-base station interface (for example, optical fiber, the X2 interface, etc.).

Figure 8:
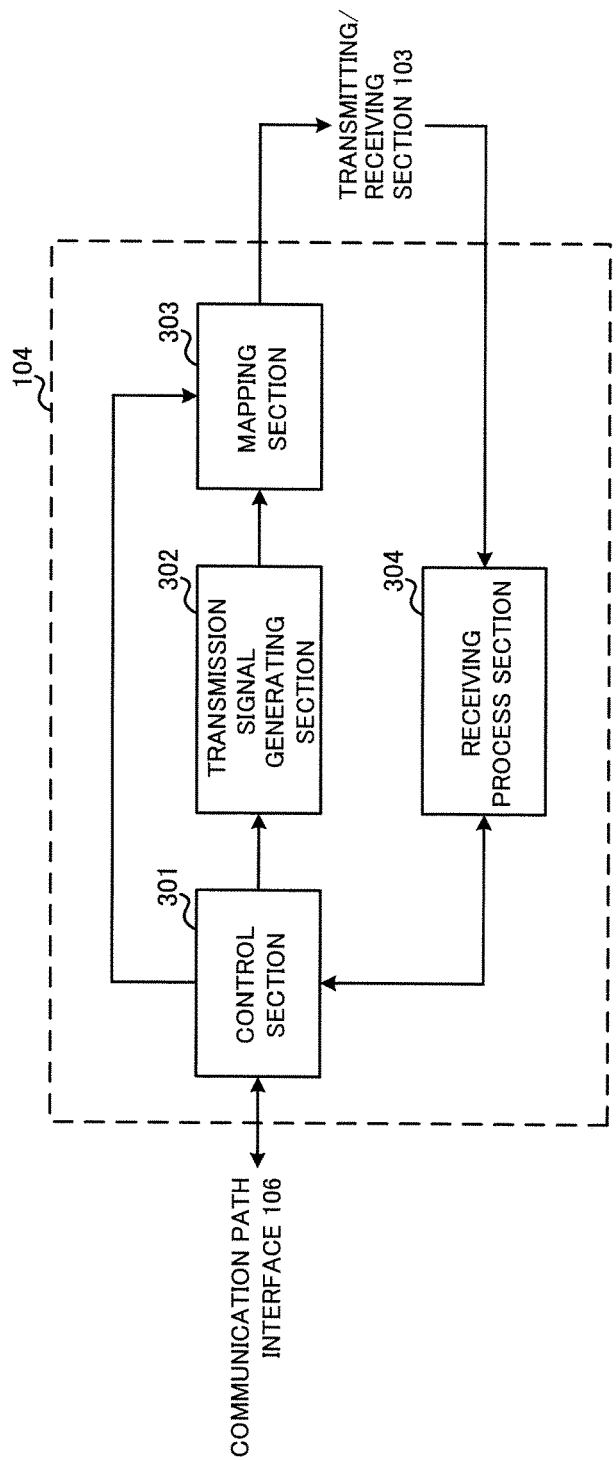
FIG. 8 is a diagram to show an example of a functional structure of a radio base station according to the present embodiment.

FIG. 8 is a diagram to show a principle functional structure of the baseband signal processing section 104 provided in the radio base station 10 according to the present embodiment. Note that, although FIG. 8 primarily shows functional blocks that pertain to characteristic parts of the present embodiment, the radio base station 10 has other functional blocks that are necessary for radio communication as well.

As shown in FIG. 8, the radio base station 10 is comprised at least of a control section (scheduler) 301, a transmission signal generating section 302, a mapping section 303 and a receiving process section 304.

The control section (scheduler) 301 controls the scheduling of downlink data signals that are transmitted in the PDSCH, and downlink control signals that are communicated in the PDCCH and/or the enhanced PDCCH (EPDCCH). Also, the control section (scheduler) 301 controls the scheduling of downlink reference signals such as system information, synchronization signals, the CRS, the CSI-RS and so on. Furthermore, the control section (scheduler) 301 also controls the scheduling of uplink data signals that are transmitted in the PUSCH, uplink control signals that are transmitted in the PUCCH and/or the PUSCH, uplink reference signals and so on. Note that the control section 301 can be constituted by a controller, a control circuit or a control device that is used in the technical field to which the present invention pertains.

Also, when transmitting antenna selection (UE transmit antenna selection) is configured in the user terminal 20, the control section 301 can apply control to specify the antenna port which the user terminal uses for UL transmission (for example, PUSCH and/or SRS transmission). To be more specific, closed-loop transmitting antenna selection (closed-loop UE transmit antenna selection) is employed, the control section 301 selects the antenna port for use by the user terminal 20, and outputs this to the transmission signal generating section 302. For the method of controlling antenna selection, one of the above-described first to fourth examples and variations, or a combination of these, can be used.

The transmission signal generating section 302 generates DL signals (downlink control signals, downlink data signals, downlink reference signals and so on) based on commands from the control section 301, and outputs these signals to the mapping section 303. For example, the transmission signal generating section 302 generates DL assignments, which report downlink signal allocation information, and UL grants, which report uplink signal allocation information, based on commands from the control section 301. Furthermore, the downlink data signals are subjected to a coding process and a modulation process, based on coding rates and modulation schemes that are determined based on CSI from each user terminal 20 and so on.

Also, based on commands from the control section 301, the transmission signal generating section 302 generates information (antenna selection information) about the antenna port which the user terminal 20 to employ transmitting antenna selection diversity selects. For example, the antenna selection information is included in downlink control information (DCI) of a predetermined format (for example, DCI format 0, 4 and/or others). Note that the transmission signal generating section 302 can be constituted by a signal generator or a signal generating circuit that is used in the technical field to which the present invention pertains.

The mapping section 303 maps the downlink signals generated in the transmission signal generating section 302 to radio resources based on commands from the control section 301. The mapping section 303 can be constituted by a mapping circuit or a mapper that is used in the technical field to which the present invention pertains.

The receiving process section 304 performs receiving processes (for example, demapping, demodulation, decoding and so on) of UL signals (uplink control signals, uplink data signals, uplink reference signals and so on) transmitted from the user terminal 20. Also, the receiving process section 304 may measure the received power (RSRP), channel states and so on by using the received signals. Note that the processing results and the measurement results may be output to the control section 301. The receiving process section 304 can be constituted by a signal processor or a signal processing circuit that is used in the technical field to which the present invention pertains.

Figure 9:
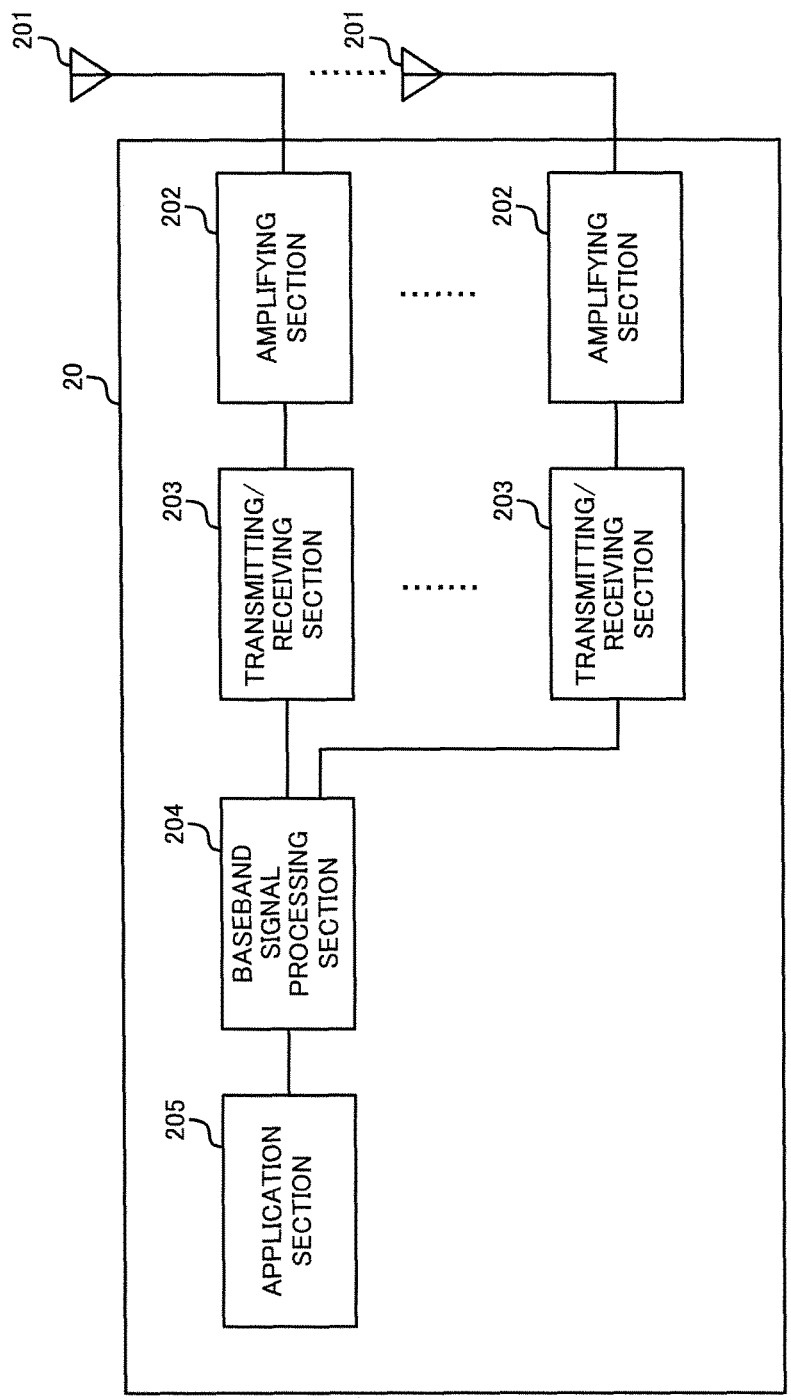
FIG. 9 is a diagram to show an example of an overall structure of a user terminal according to the present embodiment.

FIG. 9 is a diagram to show an overall structure of a user terminal 20 according to the present embodiment. As shown in FIG. 9, a user terminal 20 has a plurality of transmitting/receiving antennas 201 (antenna ports), amplifying sections 202, transmitting/receiving section 203, a baseband signal processing section 204 and an application section 205. Note that transmitting/receiving sections 203 may be comprised of transmitting sections and receiving sections.

Radio frequency signals that are received in a plurality of transmitting/receiving antennas 201 are each amplified in the amplifying sections 202. Each transmitting/receiving section 203 receives the downlink signals amplified in the amplifying sections 202. The received signals are subjected to frequency conversion and converted into the baseband signal in the transmitting/receiving sections 203, and output to the baseband signal processing section 204. The transmitting/receiving sections 203 can be constituted by transmitters/receivers, transmitting/receiving circuits or transmitting/receiving devices that are used in the technical field to which the present invention pertains.

In the baseband signal processing section 204, the baseband signals that are input are subjected to an FFT process, error correction decoding, a retransmission control receiving process and so on. Downlink user data is forwarded to the application section 205. The application section 205 performs processes related to higher layers above the physical layer and the MAC layer, and so on. Furthermore, in the downlink data, broadcast information is also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, pre-coding, a discrete Fourier transform (DFT) process, an IFFT process and so on, and the result is forwarded to each transmitting/receiving section 203. The baseband signal that is output from the baseband signal processing section 204 is converted into a radio frequency band in the transmitting/receiving sections 203. The radio frequency signals that are subjected to frequency conversion in the transmitting/receiving sections 203 are amplified in the amplifying sections 202, and transmitted from the transmitting/receiving antennas 201.

The transmitting/receiving sections 203 can transmit and receive signals to and from a plurality of radio base stations that each configure a cell group (CG) comprised of one or more cells. For example, when the user terminal 20 selects the transmitting antenna (UE transmit antenna selection), the transmitting/receiving sections 203 can select a predetermined antenna port and transmit UL signals (for example, the PUSCH, the SRS and so on).

Figure 10:
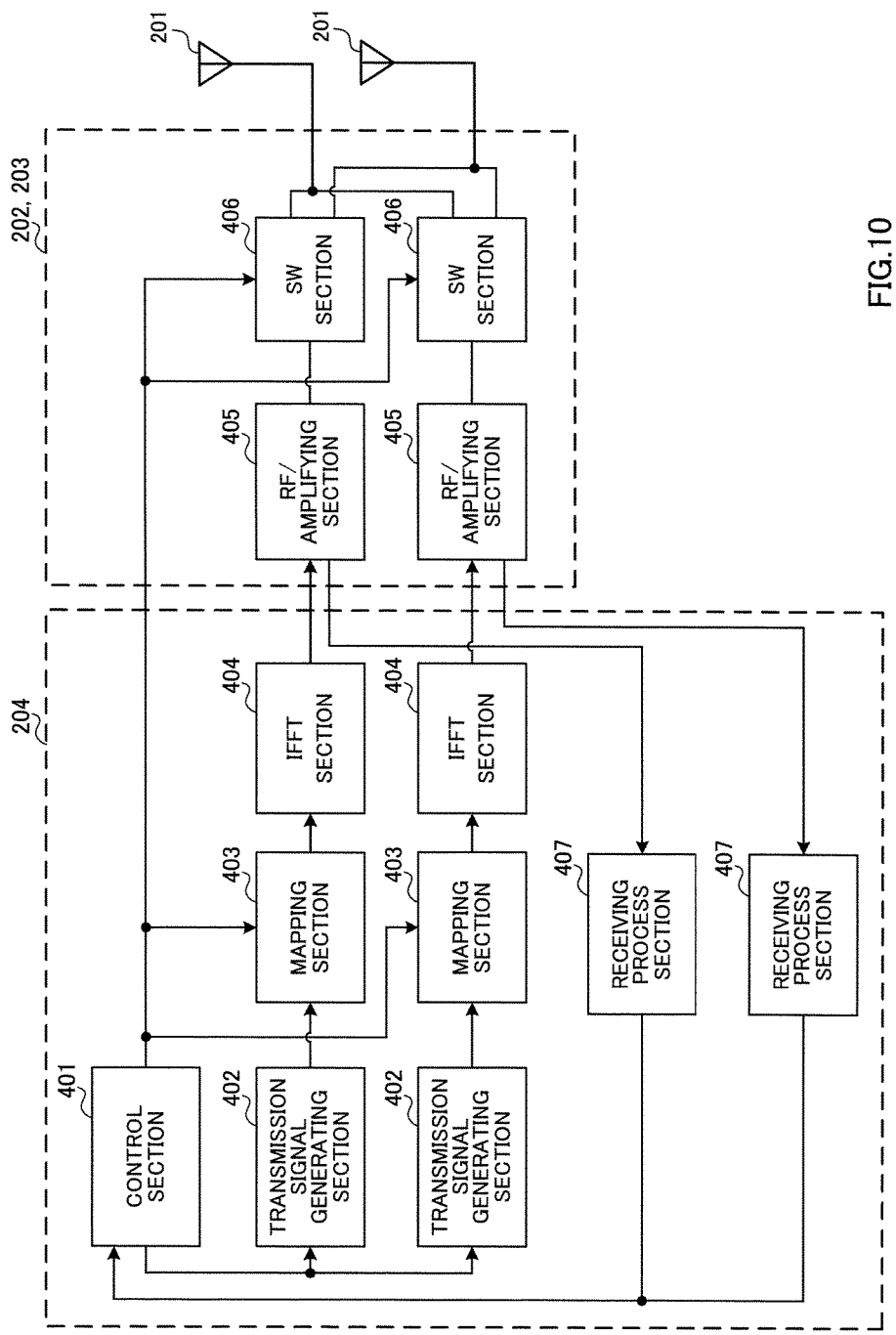
FIG. 10 is a diagram to show an example of a functional structure of a user terminal according to the present embodiment.

FIG. 10 is a diagram to show principle functional structures of the baseband signal processing section 204, the transmitting/receiving sections 203 and the amplifying sections 202, which are provided in the user terminal 20. Note that, although FIG. 10 primarily shows functional blocks that pertain to characteristic parts of the present embodiment, the user terminal 20 has other functional blocks that are necessary for radio communication as well.

As shown in FIG. 10, the user terminal 20 is comprised at least of a control section 401, a transmission signal generating section 402, a mapping section 403, an IFFT section 404, an RF/amplifying section 405, a SW section 406 and a receiving process section 407. A case is shown here where the amplifying circuit is incorporated in the RF circuit.

The control section 401 acquires the downlink control signals (signals transmitted in the PDCCH/EPDCCH) and downlink data signals (signals transmitted in the PDSCH) transmitted from the radio base station 10, from the receiving process section 407. The control section 401 controls the generation of UL signals based on the downlink control signals, the results of deciding whether or not retransmission control is necessary for the downlink control signals, and so on. To be more specific, the control section 401 controls the transmission signal generating section 402, the mapping section 403 and the SW section 406. Nor that the control section 401 can be constituted by a controller, a control circuit or a control device that is used in the technical field to which the present invention pertains.

Also, when the user terminal 20 selects the transmitting antenna (UE transmit antenna selection), the control section 401 controls the SW section 406 to select a predetermined antenna port and use the selected antenna port. For example, when the user terminal 20 connects with a plurality of radio base stations (cell groups), the control section 401 may apply control so that the same transmitting antenna port is selected for the cells that constitute the same cell group (above first example).

Also, when closed-loop transmitting antenna selection (closed-loop UE transmit antenna selection) is employed, the control section 401 can select the transmitting antenna port to use in the cells constituting each cell group, based on the antenna selection information reported from the radio base stations.

In this case, the control section 401 may assume that the same transmitting antenna selection information is transmitted in each cell constituting the same cell group. Also, when the SRS is transmitted as an UL signal, the control section 401 can apply control so as not to carry out transmissions that use different transmitting antenna ports in each cell group simultaneously.

Alternatively, the control section 401 can select different transmitting antennas on a per cell basis (the above second example). Furthermore, in dual connectivity, the control section 401 may apply control not to employ antenna selection (the above third example).

In addition, the control section 401 can select the same transmitting antenna port as the transmitting antenna port that is selected in a specific cell group (for example, the MCG), for UL transmission in another cell group (for example, an SCG) (the above fourth example).

The transmission signal generating section 402 (baseband signal generating section) generates UL signals based on commands from the control section 401 and outputs these signals to the mapping section 403. For example, the transmission signal generating section 402 generates uplink control signals such as delivery acknowledgement signals (HARQ-ACKs), channel state information (CSI) and so on, based on commands from the control section 401.

Also, the transmission signal generating section 402 generates uplink data signals (PUSCH signals) based on commands from the control section 401. For example, when a UL grant is contained in a downlink control signal reported from the radio base station 10, the control section 401 commands the transmission signal generating section 402 to generate an uplink data signal. Also, the transmission signal generating section 402 generates the SRS based on commands from the control section 401. Note that transmission signal generating section 402 can be constituted by a signal generator or a signal generating circuit that is used in the technical field to which the present invention pertains.

The mapping section 403 maps the uplink signals generated in the transmission signal generating section 402 to radio resources based on commands from the control section 401, and outputs these to IFFT section 404. The mapping section 403 can be constituted by a mapping circuit or a mapper that is used in the technical field to which the present invention pertains.

In the IFFT section 404, the frequency domain signals that are input from the mapping section 403 are subjected to an inverse fast Fourier transform (IFFT) and converted into time domain signals, and output to the RF/amplifying section 405. In the RF/amplifying section 405, the baseband signals that are input from the IFFT section 404 are converted into a radio frequency band, and output to the SW section 404. For example, the RF/amplifying section 405 can generate each CC's frequency based on predetermined reference signals, and convert the baseband signals.

The SW section 406 switches the antenna (antenna port) that outputs the signals input from the RF/amplifying section 405, according to the antenna port information output from the control section 401. The antenna port information that is output from the control section 401 may be an antenna port that is specified from the radio base stations, or may be an antenna port that is selected on the user terminal side.

The receiving process section 407 performs receiving processes (for example, demapping, demodulation, decoding and so on) of DL signals transmitted from the radio base station 10. Also, the receiving process section 407 may measure the received power (RSRP), channel states and so on, by using the received signals. Note that the processing results and the measurement results may be output to the control section 401.

In particular, when closed-loop transmitting antenna selection (closed-loop UE transmit antenna selection) is employed, the antenna selection information (information about antenna ports) that is transmitted from the radio base station 10 is decoded in the receiving process section 407, and output to the control section 401. The antenna selection information can be decoded from downlink control information and/or higher layer signaling (RRC signaling, broadcast information and so on). Also, the receiving process section 407 can be constituted by a signal processor or a signal processing circuit that is used in the technical field to which the present invention pertains.

Note that the block diagrams that have been used to describe the above embodiments show blocks in function units. These functional blocks (components) may be implemented in arbitrary combinations of hardware and software. Also, the means for implementing each functional block is not particularly limited. That is, each functional block may be implemented with one physically-integrated device, or may be implemented by connecting two physically-separate devices via radio or via wire and using these multiple devices.

For example, part or all of the functions of radio base stations 10 and user terminals 20 may be implemented using hardware such as ASICs (Application-Specific Integrated Circuits), PLDs (Programmable Logic Devices), FPGAs (Field Programmable Gate Arrays), and so on. Also, the radio base stations 10 and user terminals 20 may be implemented with a computer device that includes a processor (CPU), a communication interface for connecting with networks, a memory and a computer-readable storage medium that holds programs.

Here, the processor, the memory and/or others are connected with a bus for communicating information. Also, the computer-readable recording medium is a storage medium such as, for example, a flexible disk, an opto-magnetic disk, a ROM, an EPROM, a CD-ROM, a RAM, a hard disk and so on. Also, the programs may be transmitted from the network through, for example, electric communication channels. Also, the radio base stations 10 and user terminals 20 may include input devices such as input keys and output devices such as displays.

The functional structures of the radio base stations 10 and user terminals 20 may be implemented with the above-described hardware, may be implemented with software modules that are executed on the processor, or may be implemented with combinations of both. The processor controls the whole of the user terminals by running an operating system. Also, the processor reads programs, software modules and data from the storage medium into the memory, and executes various types of processes based on these. Here, the programs have only to be programs that make a computer execute each operation that has been described with the above embodiments. For example, the control section 401 of the user terminals 20 may be stored in the memory and implemented by a control program that operates on the processor, and other functional blocks may be implemented likewise.

Now, although the present invention has been described in detail above, it should be obvious to a person skilled in the art that the present invention is by no means limited to the embodiments described herein. For example, the above-described embodiments may be used individually or in combinations. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The disclosure of Japanese Patent Application No. 2014-163017, filed on Aug. 8, 2014, including the specification, drawings and abstract, is incorporated herein by reference in its entirety.

The invention claimed is:

1. A user terminal that supports communication which uses dual connectivity with a plurality of radio base stations that each configure a cell group formed with one or more cells, the user terminal comprising:
   a transmitter that transmits UL signals to at least one cell group; and
   a processor that controls antenna selection for transmitting the UL signals,
   wherein, when antenna selection for a serving cell (UE transmit antenna selection) is configured, the processor controls at least one of open-loop antenna selection and closed-loop antenna selection while assuming that a plurality of the cell groups are not configured, and
   when a plurality of cells are configured, the processor assumes that the plurality of cells use a same transmission antenna port.

2. The user terminal according to claim 1, further comprising a receiver that receives antenna selection information that is transmitted from a radio base station through higher layer signaling,
   wherein the processor controls the antenna selection based on the antenna selection information.

3. The user terminal according to claim 1, wherein the antenna selection is closed-loop antenna selection.

4. The user terminal according to claim 1, wherein, when the plurality of cell groups are configured, the processor applies control not to employ the antenna selection.

5. The user terminal according to claim 2, wherein the antenna selection is closed-loop antenna selection.

6. The user terminal according to claim 2, wherein, when the plurality of cell groups are configured, the processor applies control not to employ the antenna selection.

7. The user terminal according to claim 3, wherein, when the plurality of cell groups are configured, the processor applies control not to employ the antenna selection.

8. A radio communication method for a user terminal that supports communication which uses dual connectivity with a plurality of radio base stations that each configure a cell group formed with one or more cells, the radio communication method comprising the steps of:
   transmitting UL signals to at least one cell group; and
   controlling antenna selection for transmitting the UL signals,
   wherein, when antenna selection for a serving cell (UE transmit antenna selection) is configured, at least one of open-loop antenna selection and closed-loop antenna selection is controlled while assuming that a plurality of the cell groups are not configured, and
   when a plurality of cells are configured, the processor assumes that the plurality of cells use a same transmission antenna port.

9. The radio communication method according to claim 8, further comprising the step of controlling the antenna selection based on antenna selection information that is transmitted from a radio base station through higher layer signaling.

10. The radio communication method according to claim 8, wherein the antenna selection is closed-loop antenna selection.

11. The radio communication method according to claim 9, wherein the antenna selection is closed-loop antenna selection.

12. A radio communication system comprising a plurality of radio base stations that each configure a cell group comprised of one or more cells, and a user terminal that supports communication which uses dual connectivity with the plurality of radio base stations, wherein the user terminal comprises:
   a transmitter that transmits UL signals to at least one cell group; and
   a processor that controls antenna selection for transmitting the UL signals,
   wherein, when antenna selection for a serving cell (UE transmit antenna selection) is configured, the processor controls at least one of open-loop antenna selection and closed-loop antenna selection while assuming that a plurality of the cell groups are not configured, and
   when a plurality of cells are configured, the processor assumes that the plurality of cells use a same transmission antenna port.

13. The radio communication system according to claim 12, wherein the user terminal further comprises a receiver that receives antenna selection information that is transmitted from a radio base station through higher layer signaling,
   wherein the processor controls the antenna selection based on the antenna selection information.

14. The radio communication system according to claim 12, wherein the antenna selection is closed-loop antenna selection.

15. The radio communication system according to claim 13, wherein the antenna selection is closed-loop antenna selection.

* * * * *